(12) United States Patent
Uchiyama et al.

(10) Patent No.: US 9,519,846 B2
(45) Date of Patent: Dec. 13, 2016

(54) CARD READER

(71) Applicant: NIDEC SANKYO CORPORATION, Suwa-gun, Nagano (JP)

(72) Inventors: Ryo Uchiyama, Nagano (JP); Kazunori Takahashi, Nagano (JP); Tomoya Sato, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 14/980,720

(22) Filed: Dec. 28, 2015

(65) Prior Publication Data

US 2016/0189012 A1    Jun. 30, 2016

(30) Foreign Application Priority Data

Dec. 25, 2014  (JP) ................................. 2014-262755

(51) Int. Cl.
*G06K 13/04*    (2006.01)
*G06K 13/103*    (2006.01)

(52) U.S. Cl.
CPC .................................. *G06K 13/103* (2013.01)

(58) Field of Classification Search
CPC ...... G06Q 20/341; G06Q 20/342; G06K 7/00; G06K 17/00; G06K 19/07716
USPC ................... 235/479, 383, 482, 380
See application file for complete search history.

(56) References Cited

U.S. PATENT DOCUMENTS

| | | | | |
|---|---|---|---|---|
| 6,367,700 B1* | 4/2002 | Kanayama | ........... | G06K 7/0021 235/441 |
| 2001/0017318 A1* | 8/2001 | Nagata | ................. | G06K 7/0021 235/451 |
| 2004/0262389 A1* | 12/2004 | Nagata | ................. | G06K 7/0021 235/441 |
| 2006/0086793 A1* | 4/2006 | Oguchi | ................. | G06K 13/08 235/441 |

FOREIGN PATENT DOCUMENTS

JP          H11259604 A    9/1999

* cited by examiner

*Primary Examiner* — Daniel St Cyr
(74) *Attorney, Agent, or Firm* — Cantor Colburn LLP

(57) ABSTRACT

A card reader may include a card passage; a pulling-out prevention member; and a turning mechanism structured to turn the pulling-out prevention member between the closing position and the open position. The pulling-out prevention member may include a card abutting part. The card abutting part may be formed with an abutting face structured to abut with a front end of the card having been inserted into the card reader when the pulling-out prevention member is located at the closing position. The abutting face may be set to be an inclined face which is inclined to the rear side as going to the second direction side when viewed in the width direction of the card in a case that the pulling-out prevention member is located at the closing position.

10 Claims, 3 Drawing Sheets

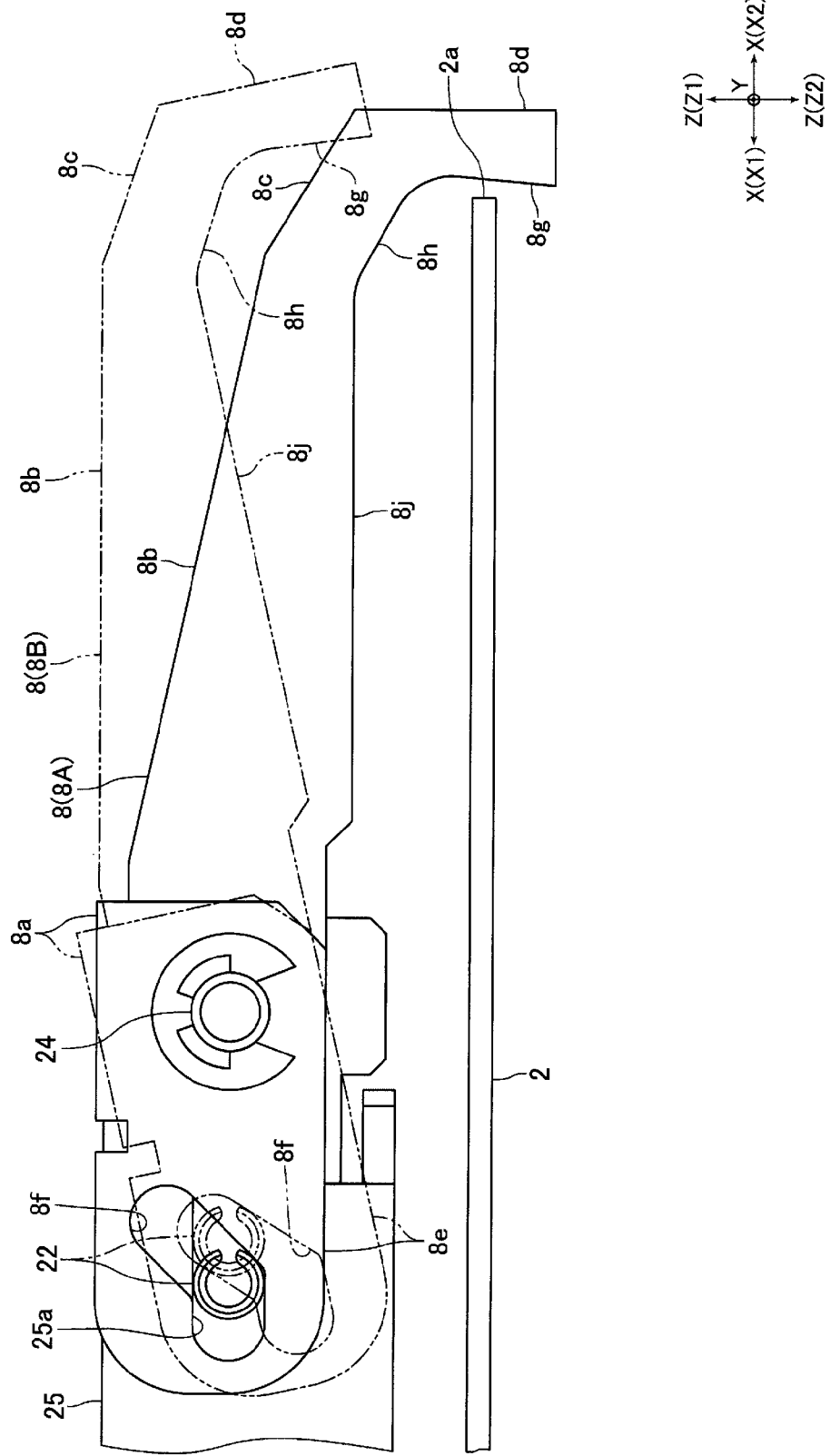

CARD READER

CROSS REFERENCE TO RELATED APPLICATION

The present invention claims priority under 35 U.S.C. §119 to Japanese Application No. 2014-262755 filed Dec. 25, 2014, the entire content of which is incorporated herein by reference.

FIELD OF THE INVENTION

At least an embodiment of the present invention may relate to a card reader which is structured to read data recorded in a card and/or to record data to a card.

BACKGROUND

Conventionally, a so-called dip-type card reader has been known in which a card is manually operated to perform reading of data recorded in a card and recording data to the card (see, for example, Japanese Patent Laid-Open No. Hei 11-259604). The card reader described in the Patent Literature is formed with a card passage where a card inserted into a card insertion port is passed. The card reader includes a plurality of IC contact springs structured to contact with external connection terminals of an IC chip formed on a surface of a card and a card lock member structured to prevent the card inserted into the card reader from being pulled out. The card lock member is connected with a solenoid and is turnable between a closing position where the card passage is closed and an open position where the card passage is opened. Further, the card lock member located at the closing position functions to prevent a card from being pulled out from the card reader when the external connection terminals of an IC chip formed on the card and the IC contact springs are contacted with each other to perform data communication.

In a state that a card is inserted into the card reader and the external connection terminals of an IC chip formed on the card and the IC contact springs are contacted with each other to perform data communication, if the card is pulled out from the card reader, a problem may be occurred that, for example, data to be recorded to the card are not recorded or data having been recorded in the card are erased. In order to prevent the problem, in the market, a card reader in which an inserted card can be surely prevented from being pulled out is required.

SUMMARY

In view of the problem described above, at least an embodiment of the present invention may advantageously provide a card reader which is capable of surely preventing pulling-out of an inserted card.

According to at least an embodiment of the present invention, there may be provided a card reader which is structured to perform at least one of reading of data recorded in a card and recording of data to the card. The card reader includes a card passage where the card is passed, a pulling-out prevention member which is structured so as to be turnable between a closing position where the card passage is closed and an open position where the card passage is opened and is structured to prevent pulling-out of the card inserted into the card reader at the closing position, and a turning mechanism structured to turn the pulling-out prevention member between the closing position and the open position. When a direction perpendicular to a passing direction of the card passing the card passage and a thickness direction of the card passing the card passage is referred to as a width direction of the card, an inserting direction side for the card to the card reader is referred to as a rear side, a pulling-out direction side for the card from the card reader is referred to a front side, one side in the thickness direction of the card is referred to as a first direction side, and the other side in the thickness direction of the card is referred to as a second direction side, the pulling-out prevention member is provided with a card abutting part which closes a part of the card passage when the pulling-out prevention member is located at the closing position. The card abutting part is formed with an abutting face which is capable of abutting with a front end of the card inserted into the card reader when the pulling-out prevention member is located at the closing position, and the card abutting part is moved from the first direction side to the second direction side when the pulling-out prevention member is moved from the open position to the closing position. In addition, the abutting face is formed in an inclined face which is inclined to the rear side as going to the second direction side when viewed in the width direction of the card in a case that the pulling-out prevention member is located at the closing position.

In the card reader in at least an embodiment of the present invention, the card abutting part for closing a part of the card passage when the pulling-out prevention member is located at the closing position is moved from the first direction side to the second direction side when the pulling-out prevention member is moved from the open position to the closing position. Further, in at least an embodiment of the present invention, the card abutting part is formed with an abutting face which is capable of abutting with a front end of the card inserted into the card reader when the pulling-out prevention member is located at the closing position, and the abutting face is formed in an inclined face which is inclined to the rear side as going to the second direction side when viewed in the width direction of the card in a case that the pulling-out prevention member is located at the closing position. Therefore, according to at least an embodiment of the present invention, when the front end of a card which is going to be pulled out from the card reader is abutted with the abutting face, a force in a direction where the pulling-out prevention member is directed to the closing position is acted on the pulling-out prevention member and thus the pulling-out prevention member cannot be moved to the open position. Accordingly, in at least an embodiment of the present invention, pulling-out of a card inserted into the card reader can be surely prevented by the pulling-out prevention member.

In at least an embodiment of the present invention, a gap space is formed between a front end of the card reached to an insertion limited position of the card to the rear side of the card reader and the abutting face which is movable between the open position and the closing position. According to this structure, contact of the front end of the card and the abutting face can be prevented. Therefore, damage of the front end of the card can be prevented.

In at least an embodiment of the present invention, the pulling-out prevention member is turnable with the width direction of the card as an axial direction of turning, and a turning center of the pulling-out prevention member is disposed on the rear side relative to the card abutting part and on the first direction side relative to the card passage.

In this case, it is preferable that the pulling-out prevention member is provided with an extended part, which is extended from the turning center of the pulling-out prevention member to the front side, and a second extended part which is extended from a front end of the extended part to the front side and the second direction side, the card abutting part is formed so as to extend from a tip end of the second extended part to the second direction side, an end face on the second direction side of the second extended part is a first end face which is connected with the abutting face, an end face on the second direction side of the extended part is a second end face which is connected with the first end face, and round-processing is performed on a boundary portion between the abutting face and the first end face and a boundary portion between the first end face and the second end face. According to this structure, even when a card which is going to be pulled out from the card reader is abutted with the abutting face and a pulling-out force of the card is acted on the abutting face, stress can be prevented from concentrating on a boundary portion between the abutting face and the first end face and on a boundary portion between the first end face and the second end face. Therefore, damage and deformation of the pulling-out prevention member can be prevented.

In at least an embodiment of the present invention, the pulling-out prevention member is formed of stainless steel. According to this structure, rigidity of the pulling-out prevention member can be enhanced. Therefore, damage and deformation of the pulling-out prevention member can be prevented.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4 is a side view showing a pulling-out prevention member, a shaft support member and the like viewed from an opposite side to a state shown in FIG. 2.

DETAILED DESCRIPTION OF THE PREFERRED EMBODIMENTS

An embodiment of the present invention will be described below with reference to the accompanying drawings.

(Entire Structure of Card Reader)

Figure 1:
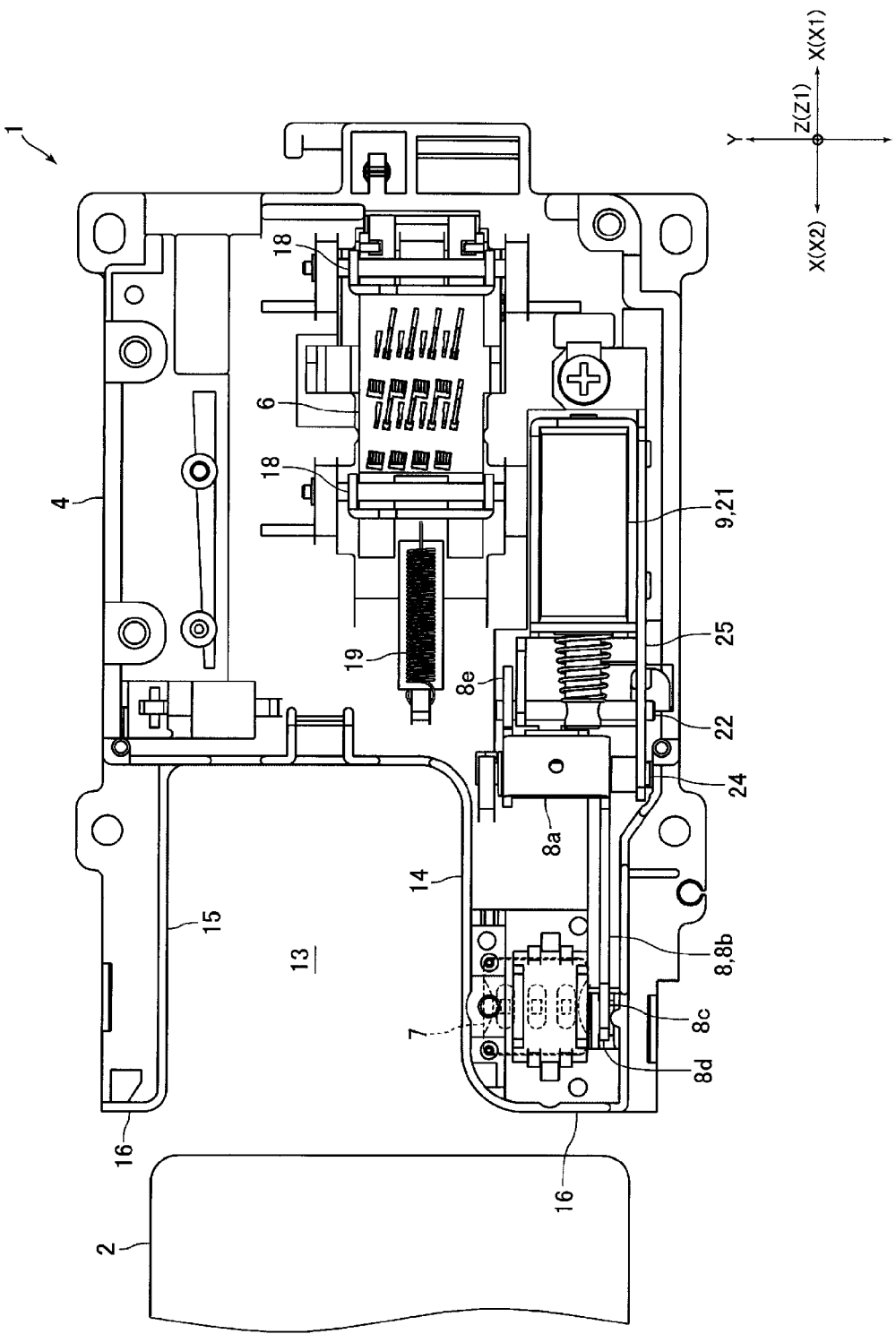
FIG. 1 is an explanatory plan view showing a structure of a card reader in accordance with an embodiment of the present invention.
Figure 2:
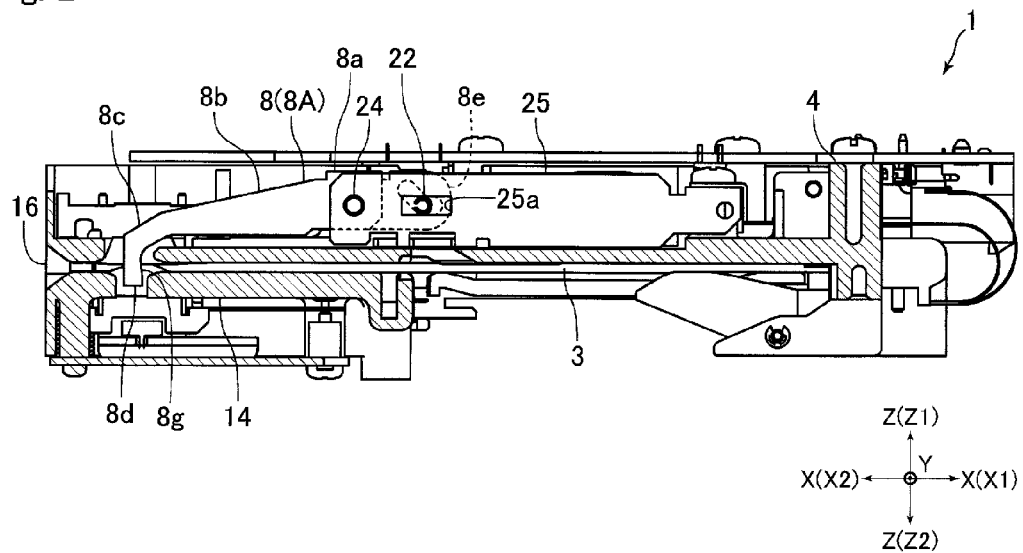
FIG. 2 is an explanatory longitudinal sectional view showing a structure of the card reader in FIG. 1.
Figure 3A:
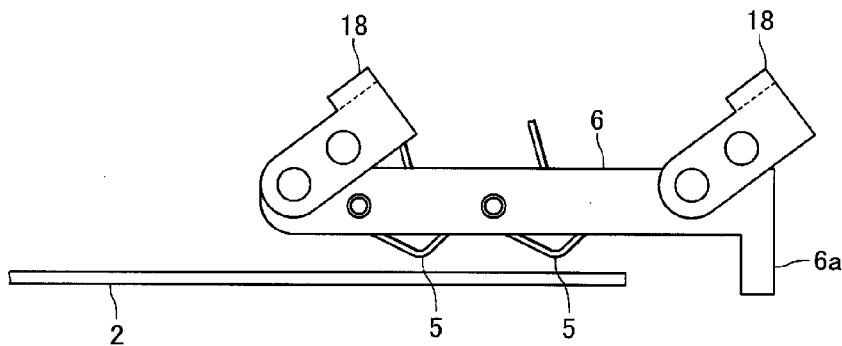
FIGS. 3A and 3B are explanatory side views showing an operation of an IC contact block shown in FIG. 1.
Figure 3B:
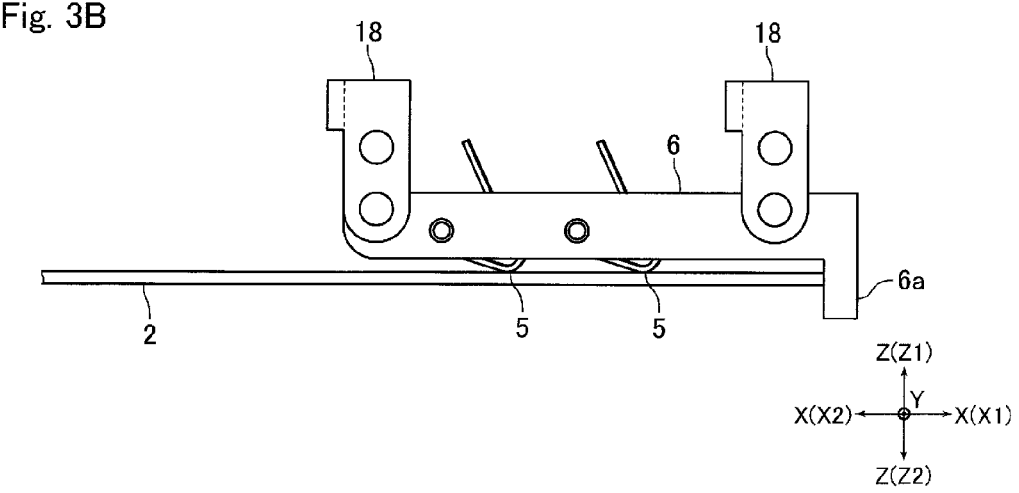

FIG. 1 is an explanatory plan view showing a structure of a card reader 1 in accordance with an embodiment of the present invention. FIG. 2 is an explanatory longitudinal sectional view showing a structure of the card reader 1 in FIG. 1. FIGS. 3A and 3B are explanatory side views showing an operation of an IC contact block 6 shown in FIG. 1.

A card reader 1 in this embodiment is a device in which a card 2 is manually operated by a user and at least one of reading of data recorded in the card 2 and recording of data to the card 2 is performed. Specifically, the card reader 1 is a so-called dip-type card reader in which a card 2 is manually inserted into the card reader 1 and the card 2 is manually pulled out from the card reader 1 and reading and/or recording of data are performed. The card reader 1 is mounted and used in a predetermined host apparatus (not shown).

As shown in FIG. 2, the card reader 1 is formed with a card passage 3 where a card 2 is passed. The card reader 1 includes a frame 4 provided with the card passage 3 in its inside, an IC contact block 6 having a plurality of IC contact springs 5, and a magnetic head 7. Further, the card reader 1 includes a lever member 8 as a pulling-out prevention member which is structured to prevent pulling-out of the card 2 having been inserted into the card reader 1, and a turning mechanism 9 structured to turn the lever member 8.

In this embodiment, a card 2 is passed in an "X" direction shown in FIG. 1 and the like. Specifically, a card 2 is inserted in an "X1" direction and the card 2 is pulled out in an "X2" direction. In other words, the "X1" direction side is an inserting direction side of a card 2 to the card reader 1, and the "X2" direction side is a pulling-out direction side of the card 2 from the card reader 1. Further, a "Z" direction in FIG. 1 and the like perpendicular to the "X" direction is a thickness direction of a card 2 passing the card passage 3, and a "Y" direction in FIG. 1 and the like perpendicular to the "X" direction and the "Z" direction is a width direction of the card 2 passing the card passage 3. In the following description, the "X" direction is referred to as a "front and rear direction", the "Y" direction is referred to as a "right and left direction", and the "Z" direction is referred to as an "upper and lower direction". Further, the "X1" direction side is referred to as a "back (rear)" side, the "X2" direction side is referred to as a "front" side, the "Z1" direction side is referred to as an "upper" side, and the "Z2" direction side is referred to as a "lower" side. In this embodiment, an upper side ("Z1" direction side) is a first direction side which is one side in the thickness direction of a card 2, and a lower side ("Z2" direction side) is a second direction side which is the other side in the thickness direction of the card 2.

The card 2 is a substantially rectangular-shaped card made of vinyl chloride whose thickness is about 0.7-0.8 mm. The card 2 is in conformity with the international standard or JIS standard. A rear face of the card 2 is formed with a magnetic stripe in which magnetic data are recorded. Further, the card 2 is incorporated with an IC chip and a front face of the card 2 is formed with external connection terminals of the IC chip. The card 2 is inserted into the card reader 1 in a state that a front face of the card 2 is directed to an upper side and a longitudinal direction of the card 2 is substantially coincided with the front and rear direction.

As shown in FIG. 1, a portion on a front end side of the card reader 1 is provided with a cut-out part 13 which is cut out so that a card 2 is capable of being inserted by a user and the card 2 is capable of being pulled out by the user. Specifically, the cut-out part 13 whose shape when viewed in the upper and lower direction is a substantially "U"-shape is formed so as to be cut from a front end of the frame 4 toward its rear side. Further, the cut-out part 13 is formed at a middle position of the frame 4 in the right and left direction, and protruded parts 14 and 15 are formed on both sides of the cut-out part 13 in the right and left direction. A width in the right and left direction of the cut-out part 13 is set to be a size so that fingers of a user can be accommodated.

The card passage 3 is, as shown in FIG. 2, formed in a straight shape when viewed in the right and left direction. A front end of the card passage 3 is formed with an insertion port 16 into which a card 2 is inserted. In other words, the insertion port 16 is formed at front ends of the protruded parts 14 and 15. The magnetic head 7 is disposed in a front end portion of the protruded part 14. Further, the magnetic head 7 is disposed so that a gap of the magnetic head 7 faces the card passage 3 from a lower side.

The IC contact block 6 is disposed in a rear end side portion of the card reader 1. Further, the IC contact block 6 is disposed so that the IC contact springs 5 face the card passage 3 from an upper side, and the IC contact block 6 is disposed to an upper side of the card passage 3. As shown in FIGS. 3A and 3B, a rear end of the IC contact block 6 is provided with a card engaging part 6a structured to engage with a tip end (rear end) of a card 2.

The IC contact block 6 is connected with an upper end side portion of the frame 4 through a parallel link mechanism 18 and is capable of being moved up and down while sliding in the front and rear direction. Specifically, the IC contact block 6 moves down as shown in FIG. 3B when it is moved to the rear side and, when moved to the front side, the IC contact block 6 is moved upward as shown in FIG. 3A. Further, the IC contact block 6 is urged to the front side by a tension coil spring 19. In accordance with an embodiment of the present invention, it may be structured that a part of the IC contact block 6 is engaged with a guide groove formed in the frame 4 and the IC contact block 6 is moved up and down by being guided by the guide groove while sliding in the front and rear direction.

In this embodiment, when a tip end of a card 2 inserted to a rear side of the card reader 1 is engaged with the card engaging part 6a of the IC contact block 6, the IC contact block 6 is moved down while sliding to the rear side and a plurality of the IC contact springs 5 is contacted with external connection terminals of the card 2 (see FIG. 3B). Further, when the card 2 inserted to the rear side is pulled out to the front side, the IC contact block 6 is moved upward while sliding to the front side by an urging force of the tension coil spring 19 so that the IC contact springs 5 are separated from a front face of the card 2 (see FIG. 3A).

In this embodiment, when the IC contact block 6 is moved down while sliding to the rear side, a plurality of the IC contact springs 5 is contacted with external connection terminals of a card 2 and the card 2 is unable to further move to the rear side (state shown in FIG. 3B), this is a state that the card 2 has been reached to an insertion limited position of a card 2 to the rear side of the card reader 1. Further, when the IC contact block 6 is moved down while sliding to the rear side, a plurality of the IC contact springs 5 is contacted with external connection terminals of a card 2 and the card 2 is unable to further move to the rear side, the card 2 is set at a design position for a card 2 when the external connection terminals of the card 2 and the card reader 1 are communicated with each other.

(Structures of Lever Member and Turning Mechanism)

FIG. 4 is a side view showing the lever member 8, a shaft support member 25 and the like viewed from an opposite side to a state shown in FIG. 2.

The lever member 8 is turnable between a closing position 8A where the card passage 3 is closed (position shown in FIG. 2 and position shown by the solid line in FIG. 4) and an open position 8B where the card passage 3 is opened (position shown by the two-dot chain line in FIG. 4). The lever member 8 located at the closing position 8A prevents pulling-out of a card 2 having been inserted into the card reader 1. The turning mechanism 9 turns the lever member 8 between the closing position 8A and the open position 8B. The turning mechanism 9 includes a solenoid 21 and a fixed pin 22 which is fixed to a plunger of the solenoid 21. The fixed pin 22 is disposed so that its axial direction and the right and left direction are coincided with each other. Further, the fixed pin 22 is fixed to the plunger so that both right and left end side portions of the fixed pin 22 are protruded from the plunger.

The lever member 8 is formed of stainless steel. Specifically, the lever member 8 is formed by bending stainless sheet steel in a predetermined shape. The lever member 8 is turnably held by a turning center shaft 24 which is disposed with the right and left direction as its axial direction and is turnable with the right and left direction as an axial direction of turning and the lever member 8 is turnably held with the turning center shaft 24 as a turning center. Further, the lever member 8 is provided with a turning center part 8a supported by the turning center shaft 24, an extended part 8b which is extended toward a front side from the turning center part 8a (in other words, extended to the front side from a turning center of the lever member 8), a second extended part 8c which is extended from a front end of the extended part 8b to the front side and to a lower side, a card abutting part 8d which is extended from a tip end (front end) of the second extended part 8c to the lower side, and a cam groove forming part 8e which is extended to a rear side from the turning center part 8a.

The turning center shaft 24 is fixed to a shaft support member 25 which is fixed to the frame 4. The turning center shaft 24 is disposed to an upper side of the card passage 3. In other words, a turning center of the lever member 8 is disposed on an upper side relative to the card passage 3. Further, the card abutting part 8d is disposed on a front side relative to the turning center part 8a and thus a turning center of the lever member 8 is disposed on a rear side relative to the card abutting part 8d. The shaft support member 25 is formed with guide grooves 25a into which both right and left end side portions of the fixed pin 22 are inserted. The guide groove 25a is formed in an elongated hole shape with the front and rear direction as its longitudinal direction. Further, the guide groove 25a is formed on a rear side relative to the turning center shaft 24.

The turning center part 8a is formed in a substantially rectangular groove shape whose both front and rear end sides and lower side are opened. The turning center shaft 24 is inserted into the turning center part 8a. The cam groove forming part 8e is formed in a substantially rectangular flat plate shape. The cam groove forming part 8e is disposed so that its thickness direction and the right and left direction are coincided with each other and a front end of the cam groove forming part 8e is connected with one end in the right and left direction of the turning center part 8a. The cam groove forming part 8e is formed with a cam groove 8f into which one end side portion in the right and left direction of the fixed pin 22 is inserted. The turning center part 8a and the cam groove forming part 8e are disposed on an upper side relative to the card passage 3.

The extended part 8b is formed in a substantially rectangular flat plate shape which is long and thin in the front and rear direction. The extended part 8b is disposed so that its thickness direction and the right and left direction are coincided with each other and a rear end of the extended part 8b is connected with the other end in the right and left direction of the turning center part 8a. The second extended part 8c and the card abutting part 8d are formed in a substantially rectangular flat plate shape and are disposed so that their thickness directions and the right and left direction are coincided with each other. The extended part 8*b* and the second extended part 8*c* are disposed to an upper side of the card passage 3.

As shown in FIG. 2, the card abutting part 8*d* closes a part of the card passage 3 when the lever member 8 is located at the closing position 8A. Specifically, the card abutting part 8*d* closes a part of the card passage 3 formed on a front side portion of the protruded part 14 when the lever member 8 is located at the closing position 8A. As described above, the extended part 8*b* and the second extended part 8*c* are disposed on an upper side relative to the card passage 3, and the card abutting part 8*d* is moved from an upper side to a lower side when the lever member 8 is moved from the open position 8B to the closing position 8A.

The card abutting part 8*d* is formed with an abutting face 8*g* which is capable of abutting with a front end 2*a* (see FIG. 4) of a card 2 having been inserted into the card reader 1 when the lever member 8 is located at the closing position 8A. In other words, a rear end face of the card abutting part 8*d* is formed as an abutting face 8*g*. As shown in FIG. 4, when the lever member 8 is located at the closing position 8A, the abutting face 8*g* is set to be an inclined face which is inclined toward a rear side as going to a lower side when viewed in the right and left direction.

A lower side end face of the second extended part 8*c* is a first end face 8*h* which is connected with the abutting face 8*g*. A lower side end face of the extended part 8*b* is a second end face 8*j* which is connected with the first end face 8*h*. As shown in FIG. 4, a boundary portion between the abutting face 8*g* and the first end face 8*h* and a boundary portion between the first end face 8*h* and the second end face 8*j* are performed with round-processing so as to be formed in a curved shape. In other words, the boundary portion between the abutting face 8*g* and the first end face 8*h* is formed in a smooth concave curved face shape, and the boundary portion between the first end face 8*h* and the second end face 8*j* is formed in a smooth concave curved face shape.

In this embodiment, a gap space is formed between the front end 2*a* of a card 2 having been reached to an insertion limited position of the card 2 to a rear side in the card reader 1 (in other words, reached to the position where a plurality of IC contact springs 5 are contacted with external connection terminals of the card 2 and, as a result, the card 2 is unable to further move to the rear side) and the abutting face 8*g* located at the closing position 8A which is capable of moving between the closing position 8A and the open position 8B. In other words, a gap space is formed so that the front end 2*a* of the card 2 having been reached to the insertion limited position of the card 2 to the rear side in the card reader 1 is not contacted with the abutting face 8*g* which is capable of moving between the closing position 8A and the open position 8B.

The solenoid 21 is disposed to a rear side of the turning center part 8*a* of the lever member 8. Further, the solenoid 21 is fixed to the frame 4 so that a plunger of the solenoid 21 is protruded to the front side. As described above, both right and left end side portions of the fixed pin 22 are inserted into the guide grooves 25*a* formed in the shaft support member 25 and the plunger is moved in the front and rear direction. Further, one end side portion in the right and left direction of the fixed pin 22 is inserted into the cam groove 8*f* formed in the lever member 8 and, when the plunger is moved in the front and rear direction, the lever member 8 is turned between the closing position 8A and the open position 8B with the turning center shaft 24 as a turning center.

In this embodiment, the lever member 8 is located at the open position 8B in a standby state that a card 2 is not inserted into the card reader 1. Further, the card reader 1 in this embodiment includes a detection mechanism structured to detect that a card 2 has been inserted to the rear side of the card passage 3 and, when it is detected that a card 2 has been inserted to the rear side of the card passage 3 based on a detected result of the detection mechanism, the lever member 8 is moved from the open position 8B to the closing position 8A. Specifically, when the card 2 has been reached to the insertion limited position for the card 2 to the rear side in the card reader 1, the lever member 8 is moved from the open position 8B to the closing position 8A.

When the lever member 8 is located at the closing position 8A, as described above, the lever member 8 prevents pulling-out of the card 2 having been inserted into the card reader 1. Specifically, the lever member 8 prevents pulling-out of the card 2 when the external connection terminals of the card 2 and the IC contact springs 5 are contacted with each other and reading and recording (communication) of data are performed. Further, when communication between the card reader 1 and the card 2 is ended and processing of the card 2 in the card reader 1 is ended, the lever member 8 is moved from the closing position 8A to the open position 8B.

(Principal Effects in this Embodiment)

As described above, in this embodiment, the card abutting part 8*d* which closes a part of the card passage 3 when the lever member 8 is located at the closing position 8A is moved from an upper side to a lower side when the lever member 8 is moved from the open position 8B to the closing position 8A. Further, in this embodiment, when the lever member 8 is located at the closing position 8A, the abutting face 8*g* which is a rear end face of the card abutting part 8*d* is set to be an inclined face which is inclined to a rear side as going to a lower side when viewed in the right and left direction. Therefore, according to this embodiment, when the front end 2*a* of a card 2 which is going to be pulled out from the card reader 1 is abutted with the abutting face 8*g*, the front end 2*a* of the card 2 is moved upward and a force in a direction where the lever member 8 is directed to the closing position 8A is acted on the lever member 8 and the lever member 8 is prevented from being moved to the open position 8B. Accordingly, in this embodiment, pulling-out of a card 2 having been inserted into the card reader 1 can be prevented surely by the lever member 8.

In this embodiment, in the lever member 8, a boundary portion between the abutting face 8*g* and the first end face 8*h* and a boundary portion between the first end face 8*h* and the second end face 8*j* are performed with round-processing. Therefore, according to this embodiment, even when a card 2 pulled out from the card reader 1 is abutted with the abutting face 8*g* and a pulling-out force of the card 2 is acted on the abutting face 8*g*, stress can be prevented from concentrating on the boundary portion between the abutting face 8*g* and the first end face 8*h* and on the boundary portion between the first end face 8*h* and the second end face 8*j*. Accordingly, in this embodiment, damage and deformation of the lever member 8 can be prevented. Especially, in this embodiment, the lever member 8 is formed of stainless steel and thus rigidity of the lever member 8 can be enhanced. Therefore, according to this embodiment, damage and deformation of the lever member 8 can be prevented effectively.

In this embodiment, a gap space is formed between the front end 2*a* of a card 2 having been reached to the insertion limited position of the card 2 to the rear side in the card reader 1 and the abutting face 8*g* which is moved between the closing position 8A and the open position 8B so that the front end 2a of the card 2 and the abutting face 8g are not contacted with each other. Therefore, according to this embodiment, the front end 2a of a card 2 can be prevented from contacting with the abutting face 8g and, as a result, occurrence of damage of the front end 2a of the card 2 can be prevented.

Other Embodiments

Although the present invention has been shown and described with reference to a specific embodiment, various changes and modifications will be apparent to those skilled in the art from the teachings herein.

In the embodiment described above, the turning center of the lever member 8 is disposed on an upper side relative to the card passage 3. However, the turning center of the lever member 8 may be disposed on a lower side relative to the card passage 3. Further, in the embodiment described above, the turning center of lever member 8 is disposed on a rear side relative to the card abutting part 8d. However, the turning center of the lever member 8 may be disposed on a front side relative to the card abutting part 8d. Further, in the embodiment described above, the lever member 8 is capable of turning with the right and left direction as an axial direction of turning. However, the lever member 8 may be capable of turning with the front and rear direction as an axial direction of turning.

In the embodiment described above, the lever member 8 is formed of stainless steel. However, the present invention is not limited to this embodiment. For example, the lever member 8 may be formed of steel material other than stainless steel or may be formed of metal material such as aluminum alloy other than steel material. Further, in the embodiment described above, the card reader 1 includes the magnetic head 7 but the card reader 1 may include no magnetic head 7.

In the embodiment described above, the card 2 is a card made of vinyl chloride whose thickness is about 0.7-0.8 mm. However, the card 2 may be a PET (polyethylene terephthalate) card whose thickness is about 0.18-0.36 mm or may be a paper card having a predetermined thickness. Further, in the embodiment described above, the card reader 1 is a manual type card reader. However, the card reader 1 may be a card conveyance type card reader including a card conveying mechanism structured to automatically convey a card 2.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader structured to perform at least one of reading of data recorded in a card and recording of data to the card, the card reader comprising:
    a card passage where the card is passed;
    a pulling-out prevention member structured to turn between a closing position where the card passage is closed and an open position where the card passage is opened and is structured to prevent pulling-out of the card inserted into the card reader at the closing position; and
    a turning mechanism structured to turn the pulling-out prevention member between the closing position and the open position;
    wherein a direction perpendicular to a passing direction of the card passing the card passage and a thickness direction of the card passing the card passage is referred to as a width direction of the card, an inserting direction side for the card to the card reader is referred to as a rear side, a pulling-out direction side for the card from the card reader is referred to as a front side, one side in the thickness direction of the card is referred to as a first direction side, and the other side in the thickness direction of the card is referred to as a second direction side;
    wherein the pulling-out prevention member comprises a card abutting part structured to close a part of the card passage when the pulling-out prevention member is located at the closing position;
    wherein the card abutting part is formed with an abutting face structured to abut with a front end of the card having been inserted into the card reader when the pulling-out prevention member is located at the closing position;
    wherein the card abutting part is structured to move from the first direction side to the second direction side when the pulling-out prevention member is moved from the open position to the closing position; and
    wherein the abutting face is inclined relative to a thickness direction of the card when the card is in the card passage and the pulling-out prevention member is located at the closing position.

2. The card reader according to claim 1, wherein a gap space is formed between the front end of the card reached to an insertion limited position of the card to the rear side of the card reader and the abutting face movable between the open position and the closing position.

3. The card reader according to claim 2, wherein
    the pulling-out prevention member is turnable with the width direction of the card as an axial direction of turning, and
    a turning center of the pulling-out prevention member is disposed on the rear side relative to the card abutting part and on the first direction side relative to the card passage.

4. The card reader according to claim 3, wherein
    the pulling-out prevention member comprises an extended part, which is extended from the turning center of the pulling-out prevention member to the front side, and a second extended part which is extended from a front end of the extended part to the front side and the second direction side,
    the card abutting part is formed so as to extend from a tip end of the second extended part to the second direction side,
    an end face on the second direction side of the second extended part is a first end face which is connected with the abutting face,
    an end face on the second direction side of the extended part is a second end face which is connected with the first end face, and
    round-processing is performed on a boundary portion between the abutting face and the first end face and a boundary portion between the first end face and the second end face.

5. The card reader according to claim 4, wherein the pulling-out prevention member is formed of stainless steel.

6. The card reader according to claim 1, wherein
the pulling-out prevention member is turnable with the width direction of the card as an axial direction of turning, and
a turning center of the pulling-out prevention member is disposed on the rear side relative to the card abutting part and on the first direction side relative to the card passage.

7. The card reader according to claim 6, wherein
the pulling-out prevention member comprises an extended part, which is extended from the turning center of the pulling-out prevention member to the front side, and a second extended part which is extended from a front end of the extended part to the front side and the second direction side,
the card abutting part is formed so as to extend from a tip end of the second extended part to the second direction side,
an end face on the second direction side of the second extended part is a first end face which is connected with the abutting face,
an end face on the second direction side of the extended part is a second end face which is connected with the first end face, and
round-processing is performed on a boundary portion between the abutting face and the first end face and a boundary portion between the first end face and the second end face.

8. The card reader according to claim 1, wherein
the pulling-out prevention member comprises an extended part, which is extended from the turning center of the pulling-out prevention member to the front side, and a second extended part which is extended from a front end of the extended part to the front side and the second direction side,
the card abutting part is formed so as to extend from a tip end of the second extended part to the second direction side,
an end face on the second direction side of the second extended part is a first end face which is connected with the abutting face,
an end face on the second direction side of the extended part is a second end face which is connected with the first end face, and
round-processing is performed on a boundary portion between the abutting face and the first end face and a boundary portion between the first end face and the second end face.

9. The card reader according to claim 8, wherein a gap space is formed between a front end of the card reached to an insertion limited position of the card to the rear side of the card reader and the abutting face movable between the open position and the closing position.

10. The card reader according to claim 8, wherein the pulling-out prevention member is formed of stainless steel.

* * * * *